United States Patent [19]

Grützner

[11] Patent Number: 4,715,583

[45] Date of Patent: Dec. 29, 1987

[54] TENSION FIXTURE FOR A CURTAIN

[75] Inventor: Hans Grützner, Kehrsatz, Switzerland

[73] Assignee: K. Bratschi, Silent Gliss, Muri near Berne, Switzerland

[21] Appl. No.: 699,663

[22] Filed: Feb. 8, 1985

[30] Foreign Application Priority Data

Feb. 9, 1984 [CH] Switzerland .................. 623/84

[51] Int. Cl.⁴ .................. A47H 5/02; B66D 1/395
[52] U.S. Cl. .................. 254/283; 254/333; 254/370; 254/372; 254/387; 160/344
[58] Field of Search .............. 254/278, 283, 287, 309, 254/333, 334, 355, 358, 359, 370, 372, 387; 474/1, 74; 160/331, 340, 341, 344, 345

[56] References Cited

U.S. PATENT DOCUMENTS

| 2,908,481 | 10/1959 | Howard ............... 254/309 |
| 3,056,586 | 10/1962 | Burrows ............. 254/372 X |
| 3,101,625 | 8/1963 | Horvath ............. 474/74 X |
| 3,561,520 | 2/1971 | Gill ................. 254/273 X |
| 3,929,038 | 12/1975 | Moser ............... 474/74 X |
| 3,945,264 | 3/1976 | Falkenberg ......... 74/242.1 A |
| 3,955,347 | 5/1976 | Schippers .......... 160/331 X |
| 4,098,196 | 7/1978 | Weihe ............... 254/287 X |

FOREIGN PATENT DOCUMENTS

| 2700948 | 7/1978 | Fed. Rep. of Germany ...... 254/372 |
| 179791 | 6/1962 | Sweden ..................... 254/372 |
| 420520 | 3/1967 | Switzerland . |
| 991543 | 5/1965 | United Kingdom . |
| 954369 | 8/1982 | U.S.S.R. .................. 254/372 |

*Primary Examiner*—Stuart S. Levy
*Assistant Examiner*—Joseph J. Hail, III
*Attorney, Agent, or Firm*—Weiser & Stapler

[57] ABSTRACT

A tensioning device for use with an endless traverse which is longitudinally adjustable in both directions responsive to a rotational drive. The rotational drive includes two driving gears which are each selectively coupled with a drive shaft so that when one of the driving gears is positively driven, the other driving gear is permitted to rotate freely. The traverse changes from one driving gear to the other by passing from between a pair of overlying side walls and over a flange. Elongation resulting from strain of the traverse is continuously led out of the system so that blocking or braking of the traverse is avoided. The tensioning device is especially suitable for the operation of strip curtains or conventional curtains, as well as for curtain systems with large and heavy traverses.

12 Claims, 9 Drawing Figures

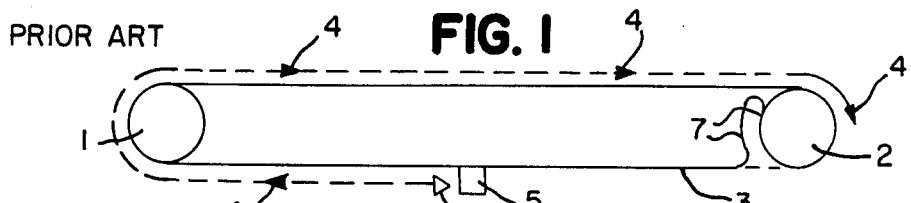
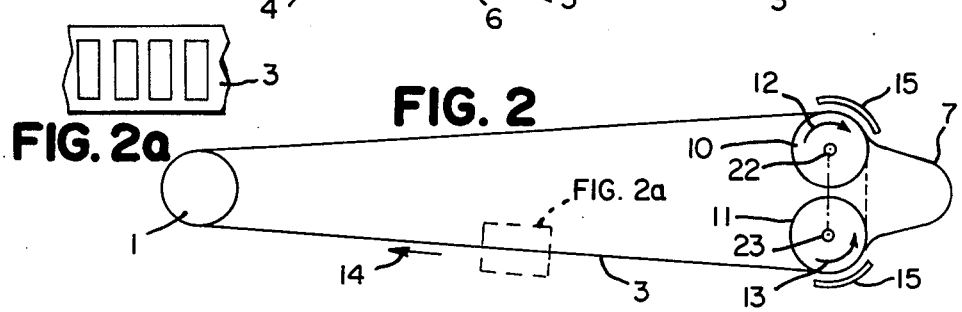
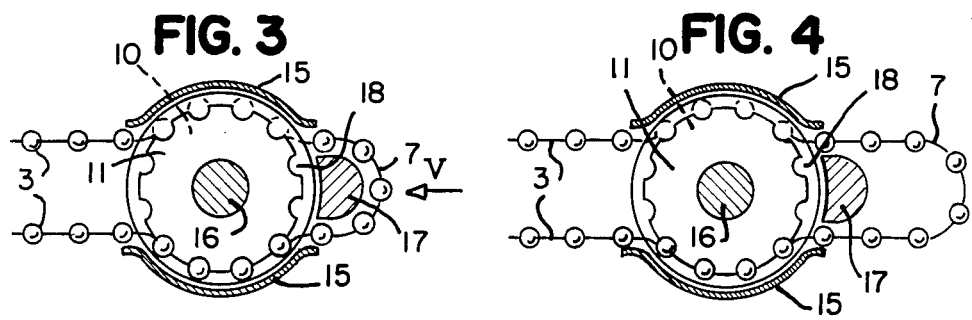
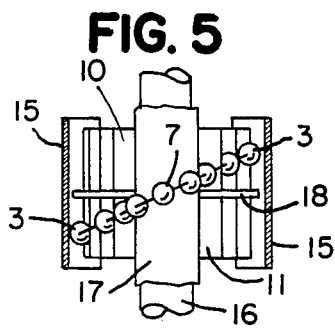
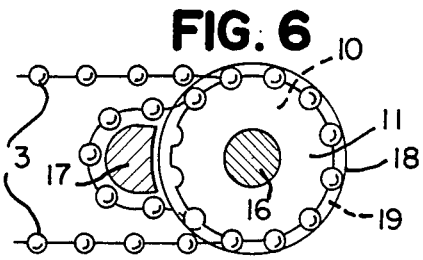
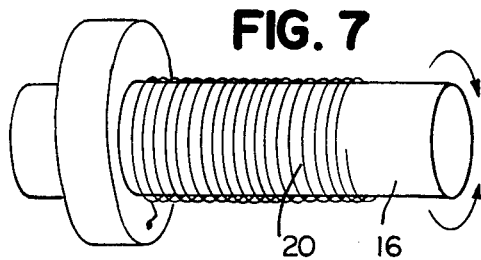
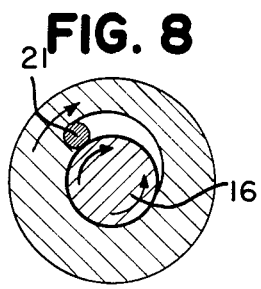

TENSION FIXTURE FOR A CURTAIN

BACKGROUND OF THE INVENTION

This invention relates to a tensioning device for use in connection with a curtain having an endless, elastic traverse which is adjustable in both directions by a rotational drive means.

One of the problems in curtain systems having an endless elastic traverse is that the traverse experiences elastic linear expansion as a result of strain. The additional elongation of the traverse can produce a braking or blocking of the traverse.

Various tensioning devices are known for use with strip curtains and/or conventional curtains which attempt to solve this expansion problem. These tensioning devices also can be used for curtain systems with large and heavy traverses.

Swiss Pat. No. 420,520 discloses a tensioning means wherein drawing of the traverse is accomplished through a connecting link, which is attached between the ends of the traverse and which is coupled to a pull cord or the like. Cord stretchers are also known which hold the traverse under tension to compensate for stretching of the traverse. Moreover, tensioning devices are known which use adjustable drive pulleys and/or deflection pulleys.

However, these prior art devices are not able to compensate for large linear expansions of the traverse, which must then from time to time be stretched back or replaced. Also, these prior art devices have the disadvantage that the tension provided is often too great for the system.

SUMMARY OF THE INVENTION

Accordingly, it is an object of the present invention to overcome these prior art disadvantages and to provide a tensioning device which is free of the problems of overtensioning.

It is another object of the present invention to provide a tensioning device which operates even in the case of large linear expansions of the traverse.

It is a further object of the present invention to provide a tensioning device which is simple in construction and inexpensive to produce.

These objects and others which will appear are achieved according to the present invention by providing a curtain system with rotational drive means having two driving gears which are coupled in selective freewheeling engagement with at least one drive shaft. The drive means serves to operate either one of the driving gears or the other, with the remaining driving gear operating in freewheeling relation to the shaft which receives it. This arrangement has the special advantages that a device for stretching back the traverse is not required, and that elongations of the traverse are continuously passed out from the area between the driving gears so that there is no braking effect or blockage.

A more detailed description of how the foregoing objects and advantages are achieved is available from the following description, referring to the accompanying drawings.

BRIEF DESCRIPTION OF THE DRAWINGS

FIG. 1 is a schematic view of a prior art tensioning device;

FIG. 2 is a schematic view of a tensioning device according to the invention;

FIG. 2a is a partial, elevational view of the tensioning device according to FIG. 2;

FIG. 3 and FIG. 4 show cross-sectional views of another tensioning device according to the invention;

FIG. 5 is a partially sectioned, end view of the tensioning device according to FIGS. 3 and 4;

FIG. 6 is a cross-sectional view of yet another tensioning device according to the invention;

FIG. 7 is a schematic view of a coiled spring coupling; and

FIG. 8 is a schematic view of a coupling with a rolling element.

DETAILED DESCRIPTION OF PREFERRED EMBODIMENTS

Although specific forms of the invention have been selected for illustration in the drawings, and the following description is drawn in specific terms for the purpose of describing these forms of the invention, this description is not intended to limit the scope of the invention which is defined in the appended claims.

FIG. 1 shows a prior art tensioning device with a reversing gear 1, and a driving gear 2 positioned at a distance from the reversing gear 1. The gears 1, 2 receive an endless belt or traverse 3, which can be a ball chain (See FIGS. 3–6), a link (bicycle) chain, a perforated band (See FIG. 2a), a V-belt or a toothed belt, for movement in the direction of the arrow 4. As the traverse 3 expands, an elongation 7 can form which can eventually tightly enclose and thereby block the driving gear 2 upon rearward movement of the curtain 5 (schematically shown) in the direction of the arrow 6. Such blocking of the traverse 3 is prevented through the use of the tensioning device according to the present invention.

The tensioning device according to the present invention, as shown in FIG. 2, has a reversing gear 1 and driving gears 10, 11 connected adjacent to each other. The driving gears 10, 11 are each connected to a driving shaft 22, 23. The driving gears 10, 11 are coupled with the driving shafts 22, 23 by means of a freewheeling coupling whereby positive driving occurs when the driving gears 10, 11 are turned in the direction of the arrows 12 and 13, and freewheeling occurs in the other directions. If the traverse 3 is adjusted by the driving gear 10 in the direction of the arrow 14, then the second gear 11 rotates freely. If the traverse 3 is adjusted by the driving gear 11 in the opposite direction (opposite the arrow 14), then the second gear 10 rotates freely. In order for the traverse 3 to remain in mesh with the gears 10 and 11, guide walls 15 overlie the gears 10, 11 in the areas which receive the traverse 3. The elongation 7 resulting from an expansion of the traverse 3 is led out of the area between the driving gears 10, 11.

A further embodiment of the tensioning device according to the present invention is shown in FIGS. 3–6, which device primarily differs from the device of FIG. 2 in that the driving gears 10, 11 are mounted over one another and on a common driving shaft 16. The traverse 3 is shown here as a ball chain and the driving gears 10, 11 are represented as toothed gears. In order that the elongation 7 of the traverse 3 does not become jammed in the gears 10, 11, a deflecting means such as deflector knob 17 is mounted between the gears 10, 11 and the elongation 7.

FIG. 5 illustrates the transition of the traverse 3 from the gear 10 to the gear 11. A flange 18 is provided between the gears 10, 11 to ensure that the cord side of the traverse 3 always remains on one driving gear and on one freewheeling gear. FIG. 6 shows a similar tensioning device in which the traverse 3 tightly encloses the driving gears 10, 11 with an additional winding 19.

FIGS. 7 and 8 illustrate examples of freewheeling couplings for operatively connecting the driving gears 10, 11 with the driving shafts 16 or 22, 23. FIG. 7 shows a known coiled spring coupling having a spring 20 which slides upon the shaft in one turning direction and which engages the shaft in the other turning direction. FIG. 8 shows a directional locking mechanism having a rolling element 21 which serves as the freewheeling coupling.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A tensioning device for use with a curtain having an endless traverse which is longitudinally movable in both directions responsive to a rotational drive means and which is subject to elongation resulting from strain:
   wherein said rotational drive means includes at least two driving gears which are operatively coupled with a common drive shaft by a freewheeling coupling such that when either one of said driving gears is operated, the other of said driving gears rotates freely; and
   wherein said elongation is caused to extend from between said driving gears.

2. The tensioning device of claim 1 wherein when said traverse is moved in a first direction, a first of said driving gears is positively driven while a second of said driving gears is permitted to freely rotate, and when said traverse is moved in a second direction opposite to said first direction, said second driving gear is positively driven while said first driving gear is permitted to rotate freely.

3. The tensioning device of claim 1 wherein guides are positioned to overlie said driving gears along portions of the driving gears which engage said traverse.

4. The tensioning device of claim 3 wherein said elongation extends from between the guides overlying said driving gears.

5. The tensioning device of claim 1 wherein said traverse extends about a deflecting means positioned between said driving gears and said traverse.

6. The tensioning device of claim 1 wherein said traverse encloses at least one of said driving gears.

7. The tensioning device of claim 1 including a flange positioned between said driving gears which rises above said driving gears in a radial direction.

8. the tensioning device of claim 1 wherein said freewheeling couplings are coiled spring couplings.

9. The tensioning device of claim 1 including a flange between said driving gears and configured to rise above said driving gears in a radial direction, and guide walls for overlying said traverse and said driving gears in contacting areas of said traverse and said driving gears, wherein portions of said traverse change from one driving gear to the other driving gear between said guide walls and over said flange so that said elongation is removed from remaining portions of said traverse.

10. The tensioning device of claim 1 wherein said traverse is a ball chain.

11. The tensioning device of claim 1 wherein said traverse is a perforated band.

12. For use in combination with an endless traverse having portions for supporting a curtain for longitudinal movement in both directions, a tensioning device for removing elongation in said traverse resulting from operational strain, said tensioning device comprising:
   rotational drive means for moving said traverse and including at least two driving gears which are operatively coupled with a common drive shaft by a freewheeling coupling such that when either one of said driving gears is rotated, the other of said driving gears rotates freely; and
   means for passing said elongation from between said driving gears so that said elongation is removed from the portions of said traverse for supporting said curtain.

* * * * *